Aug. 20, 1963   J. M. BEYERSTEDT ETAL   3,101,274
PROCESS OF APPLYING WEAR RESISTANT METAL COATINGS
Filed June 23, 1958

INVENTORS.
JOHN M. BEYERSTEDT
HELMER E. ERICKSON
HENRY H. TALBOYS
BY Parker and Carter
ATTORNEYS.

United States Patent Office 3,101,274
Patented Aug. 20, 1963

3,101,274
PROCESS OF APPLYING WEAR RESISTANT METAL COATINGS
John M. Beyerstedt, West Allis, and Helmer E. Erickson and Henry H. Talboys, Milwaukee, Wis., assignors to Nordberg Manufacturing Company, Milwaukee, Wis., a corporation of Wisconsin
Filed June 23, 1958, Ser. No. 743,868
1 Claim. (Cl. 117—46)

This invention is in the field of welding and is concerned with a method of applying a welding layer to a base metal.

A primary object of the invention is a welding method with improved carbon control.

Another object is a method of applying a welding layer to a relatively thin base metal.

Another object is a method of applying a wear-resistant layer to a base metal without cracks resulting in the weld deposit.

Another object is a welding method of the above type with lower temperatures.

Another object is a method of applying a wear-resistant layer to a base metal providing less embrittlement in the deposit and base metal.

Another object is a welding method which is faster and results in a substantial power saving.

Another object is a method of applying a wear-resistant layer to a base metal which results in very little addition of carbon to the base metal.

Another object is a method of applying a wear-resistant layer of a matrix and wear-resistant particles to a base metal with uniform distribution of particles in the applied matrix.

Another object is a method of the above type which provides a good bond between the layer and base metal.

Another object is a method of the above type with improved carbon control so that the base metal will not be embrittled.

Other objects will appear from time to time in the ensuing specification and drawings in which.

Figure 1:
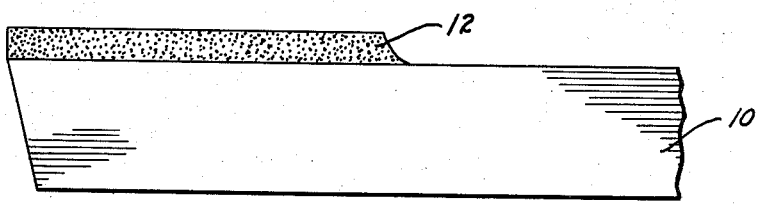
FIGURE 1 is a side view of the base metal and wear-resistant layer applied thereto.

In FIGURE 1 a base metal or base material has been indicated at 10 with a layer 12 of hard surfacing or wear-resistant material. It should be understood that the FIGURE 1 showing is intended to be representative of any application of a wear-resistant layer or coating to a base metal.

Figure 2:
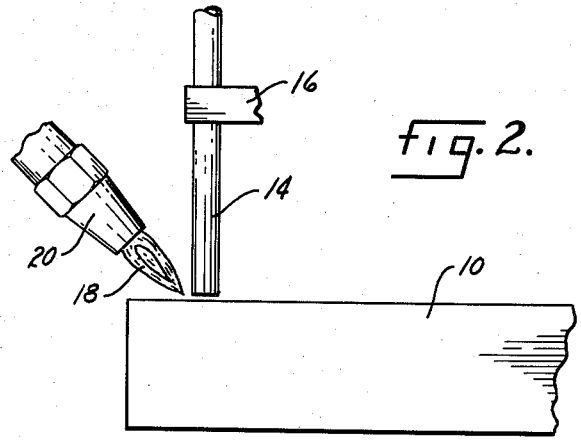
FIGURE 2 is a side schematic showing of a portion of the method.

The procedure or method of applying a coating of a wear-resistant character to a base metal is depicted somewhat in FIGURE 2 in which a rod 14, to be explained in detail hereinafter, may be held by a suitable holder 16 or the like and a flame 18 from a suitable nozzle 20 or the like applied thereto to melt the end of the rod. The base metal may be suitably preheated or otherwise prepared. The heat generated by the flame melts the rod to a relatively liquescent condition or state and, upon solidification, a layer, such as shown at 12 in FIGURE 1, is permanently adhered to the base metal. The rod may be automatically or manually fed at any predetermined or desired rate, and the rod and flame may move, as a unit, at any desired speed or rate.

The specific environment of the invention arises from applying a wear-resistant coating to adzer bits of the type shown generally in copending U.S. application Serial No. 726,864, filed April 7, 1958, now U.S. Pat. No. 2,894,419. A bit of this type is relatively thin. For example, the thickness of the bit may be on the order of ¼ of an inch.

Adzer bits may be made of A.I.S.I. 6150 steel which, as will be noted, is a steel with a relatively high carbon content. Any addition of carbon to the base metal is undesirable, since its carbon content is initially high and additional carbon will make the bit brittle. Since bits of this nature are used for heavy duty, and are subjected to high impact, a brittle bit will be entirely unsatisfactory. Therefore, in applying the wear-resistant layer, the addition of carbon to the base metal must be avoided or minimized.

Figure 3:
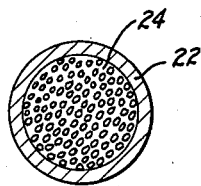
FIGURE 3 is an end view of a typical welding rod used in the method.

The layer 12 is made up of wear-resistant hard particles held in a matrix material. For example, the particles may be tungsten carbide and the matrix may be steel. The layer may come from a rod, as at 14 in cross-section in FIGURE 3, which normally includes a tube 22 containing a plurality of tungsten carbide particles 24 or other suitable wear-resistant particles. When the flame is applied, as schematically shown in FIGURE 2, the tube will melt to form the matrix, but a very small percentage, if any, of the particles will be melted. Rather, the particles will be carried by the molten matrix and, upon solidification, will be bonded in the matrix to the surface of the base metal.

It is very desirable that the particles be uniformly distributed or dispersed more or less evenly through the matrix. If the temperature of the flame is too high, the melted tube 22, which becomes the matrix, will be too liquid. The particles are heavier than the matrix. For example, tungsten carbide particles have a specific gravity of about 2.3 times that of steel. Accordingly, such particles will sink to the bottom of the liquid matrix, and will cluster against the base metal. The resulting cutter bit would perform poorly, since the matrix will be on the surface and will be rapidly worn away. The particles will be clustered against the base metal and will spoil or partially ruin the bond between the base metal and the matrix.

On the other hand, if the melted tube is not viscous enough, the particles will be confined relatively to the upper surface of the matrix and the resulting tool will be equally inefficient.

The object is to uniformly disperse or distribute the particles through the matrix for maximum efficiency. In addition to providing uniform wear on the wear-resistant layer, the bond between the matrix and base metal will be more efficient.

As an example, an oxy-acetylene flame might be used, although other types are consistent with the invention. A low carbon steel tube will melt at about 2800° F., for example, and the particles, assuming they are tungsten carbide, might have a melting point of about 4600° F.

The normal practice is to use a carburizing flame to build up carbon in the matrix of the weld deposit. If the base metal is low in carbon and if the cross-section of the base metal is fairly large in relation to the weld deposit, and the requirements of the subsequent heat treatment are not unusual, this may be satisfactory. But in this case, the base metal has a relatively high initial carbon content and may be quite thin. For example, in making adzer bits, a typical base metal might be A.I.S.I. 6150, which has a fairly high initial carbon content. Additionally, the base metal may be only ¼ of an inch thick and the wear-resistant layer should be approximately ⅟₁₆ of an inch thick, which gives about a 4 to 1 ratio.

With a base metal this thin, a carburizing flame should not be used, since the carbon from the flame will penetrate well into or through the base metal and cause an embrittlement under and around the wear-resistant layer. This is undesirable, since the part will be subjected to considerable shock in use and embrittlement cannot be tolerated. But carbon should be added to the matrix to improve its wear resistance and hold the wear-resistant particles longer, thereby giving additional life for the composite piece.

In short, we have somewhat conflicting factors. First, carbon must not be added to the base metal, since its carbon content is initially high; second, carbon should be added to the matrix since additional carbon will increase its wear-resistant qualities and therefore the overall life of the bit.

These factors may be resolved by initially carburizing the tube. This involves adding carbon to the tube before the flame melts it in applying the wear-resistant layer to the base meal. For example, the tube 22 may be of a quite low carbon steel, say, 15 to 20 points of carbon. The initial carbon content of the steel for the tube should be low, so that it may be rolled into a relatively small tube. In this invention the tube is then carburized and this may be accomplished by any suitable carburizing procedure, for example we may use liquid, gas or pack carburizing. We prefer pack carburizing, since it is a simple operation, but any suitable carburizing method may be used. In pack carburizing, the rods may be packed in a suitable carburizing material, for example a combination of hardwood charcoal, barium carbonate, sodium carbonate and coke, or any suitable material could be used. Also any suitable proportions or variations might be employed. We may use charred bone in any suitable percentage.

The rods and carburizing compound may be packed in boxes or pots made of a suitable heat-resisting alloy or otherwise, with the rods surrounded by the compound. We prefer that the compound be of a suitable fineness and somewhat evenly divided, but this is not essential. On a batch basis, the pots may be time-charged into a furnace or it might be carried out on a continuous basis. In any event, the packed boxes are heated to a suitable temperature and held for a suitable time period. For example, we may heat the boxes to 1700° F., or it may be otherwise.

Box or pack carburizing has the advantage that it may be performed by relatively untrained personnel. Also the possibility of warpage of the rods is reduced.

Regardless of what carburizing procedure is used, the carbon content of the tube might be raised from 15 or 20 points to 120 points or more of carbon.

Thereafter the flame is applied to melt the high carbon tube depositing it as a matrix layer on the base metal with the hard particles held therein. The flame should be neutral, or substantially so, meaning that it will neither add nor subtract carbon from the base metal. In the example given above of an oxy-acetylene flame, a neutral flame may be obtained by burning approximately a 1 to 1 mixture of acetylene and oxygen. Such a flame may be at approximately 6000° F.

The tube of the rod, due to its high carbon content resulting from carburizing, will melt at a lower temperature. For example, the tube might now melt at 2800° F. On the other hand, the particles may have a melting point of about 4600° F. The temperature of the flame and its proximity to the work should be adjusted, so that while the tube is melted, the particles will not be substantially affected. For example, something less than 5 percent of the particles might be dissolved, and this small addition of tungsten and carbon to the matrix may be beneficial, since its hardness and abrasive-resistant character will be increased.

The use, operation and function of the invention are as follows:

Applying a wear-resistant layer to a base metal normally involves the use of a matrix or binder material to hold a plurality of small abrasive-resistant particles on the base metal. The layer is generally applied by melting a rod with a flame. The rod is made up of a steel outer tube which contains or houses the hard particles inside. The particles are merely carried by the tube and are not chemically combined with it. When the rod is melted, the tube melts and becomes the matrix. The particles normally do not melt but are held in the liquefied matrix. After it solidifies on the surface of the base metal, the particles should be as uniformly dispersed through the matrix as possible.

Tungsten carbide particles, for example, have a specific gravity of about 2.3 times that of steel. This means that the particles will be substantially heavier than the matrix, and if the matrix is too liquid immediately after it is melted, the particles will sink to the bottom, and, when the matrix solidifies, will be clustered next to the surface of the base metal. This will reduce the efficiency of the bond between the matrix and the base metal. Therefore, the temperature of the flame that melts the tube should be as low as possible.

The tube of the rod is normally a low carbon steel since the diameter of the tube is small and the lower the carbon content of a steel the easier it is to roll to a small radius. But after the tube has been melted and becomes the matrix holding the hard wear-resistant particles, its carbon content should be increased so that its strength and wear-resistant properties will be increased. Otherwise the matrix will break down after a short life and the tungsten carbide particles will merely fall out.

Carbon is normally added to the matrix by using a carburizing flame which, in the case of an oxy-acetylene flame, means an excess of acetylene. But in addition to adding carbon to the otherwise low carbon matrix, the carburizing flame will also add carbon to the base metal which already has a high carbon content. This addition of carbon to the base metal will make it quite brittle after heat treat.

But by preliminarily carburizing the rod, very little carbon will be added to the base metal and the properties of the matrix will be improved so that the matrix will function as a long-life mechanical support and bond for the hard particles and base metal.

This procedure has the following advantages. A low carbon steel strip may be easily rolled into a small diameter tube to form the rod, and this is very difficult with a high carbon steel.

The higher the carbon content of the steel tube, the lower the temperature at which it melts. By having the carbon in the tube, we obtain better control of the carbon than if it is in the flame. Additionally, we may use a lower temperature flame thereby reducing the possibilities of embrittlement from gases in the flame and in the air. By having the carbon in the rod, the base metal will not be affected by the carbon in the heat effected zone as much as if the carbon is in the flame, and this is important since the carbon content of the base metal is initially high and we are primarily concerned with thin sections. Additionally, less heat is required which means that we may speed up the welding process and save on gas or electricity, as the case may be, and fewer problems occur. Additionally, we have found that we have eliminated cracking of the weld deposit which, prior to this invention, was considered a necessary evil when working with thin sections.

While we have shown and described a preferred form and suggested several variations of our invention, it should be understood that suitable additional modifications, changes, substitutions and alterations may be made without departing from the invention's fundamental theme. We therefore wish that the invention be unrestricted, except as by the appended claim.

We claim:

A process for applying a wear resistant metal layer to a relatively high carbon content base metal without excessively increasing the carbon content of the base metal, including the steps of providing a relatively low carbon steel tube surrounding a plurality of abrasive resistant particles, initially carburizing the tube to add a predetermined amount of carbon thereto consistant with the desired hardness of the wear resistant layer, adjusting a heat source to a generally neutral condition so that carbon will not be added to the base metal in any appreciable quantity therefrom, setting the temperature of the heat source to a sufficiently low value, relative to the melting point of the steel tube and the tube's carbon content, so that when the tube is melted on the base metal the thus formed layer, will have a viscosity such that the abrasive resistant particles will stay in suspension and will not sink to the bottom of the metal layer, applying the neutral heat source and carburized tube to the base metal for a period of time so that the steel will melt and be sufficiently liquid to form a matrix layer on the base metal of sufficient viscosity, during its liquid condition, to hold the particles in suspension, and removing the heat source and allowing the matrix to solidify with the particles distributed therein.

References Cited in the file of this patent

UNITED STATES PATENTS

| | | |
|---|---|---|
| 1,517,292 | Jones | Dec. 2, 1924 |
| 2,003,019 | Strobel | May 28, 1935 |
| 2,113,667 | Swift | Apr. 12, 1938 |
| 2,288,869 | Wassermann | July 7, 1942 |
| 2,427,517 | Wilson et al. | Sept. 16, 1947 |
| 2,592,414 | Gibson | Apr. 8, 1952 |
| 2,841,687 | Richter | July 1, 1958 |
| 2,888,344 | Noren | May 26, 1959 |

FOREIGN PATENTS

| | | |
|---|---|---|
| 350,607 | Great Britain | June 18, 1931 |
| 350,608 | Great Britain | June 18, 1931 |

OTHER REFERENCES

Stoody Co., Catalog No. 105, Whittier, Calif. (pp. 13–14 relied on).